United States Patent [19]

Wick, deceased et al.

[11] 3,962,173

[45] June 8, 1976

[54] PROCESS FOR THE PREPARATION OF EASILY DISPERSIBLE AND STABLE MOLYBDATE RED AND CHROME YELLOW PIGMENTS

[75] Inventors: Dieter Wick, deceased, late of Eschborn, Taunus, Germany; by Anna Elisabeth Wick nee Sommer, heiress, Liederbach, Taunus, Germany

[73] Assignee: Hoechst Aktiengesellschaft, Frankfurt am Main, Germany

[22] Filed: Jan. 20, 1975

[21] Appl. No.: 542,422

[30] Foreign Application Priority Data

Jan. 21, 1974 Germany............................ 2402694

[52] U.S. Cl. .......................... 260/39 R; 106/308 M; 106/308 N; 260/39 S
[51] Int. Cl.$^2$............................................ C08K 9/04
[58] Field of Search...................... 260/39 P, 39 SB; 106/308 N, 308 M

[56] References Cited

UNITED STATES PATENTS

| | | | |
|---|---|---|---|
| 2,197,442 | 4/1940 | Widmer............................ | 260/39 P |
| 2,479,836 | 8/1949 | Hoback et al...................... | 260/22 R |
| 3,386,845 | 6/1968 | Offermann et al.............. | 106/308 N |
| 3,759,732 | 9/1973 | Twist et al...................... | 106/308 M |
| 3,827,902 | 8/1974 | Schwerin et al................ | 106/308 N |

*Primary Examiner*—Lewis T. Jacobs
*Assistant Examiner*—S. M. Person
*Attorney, Agent, or Firm*—Curtis, Morris & Safford

[57] ABSTRACT

The dispersibility of molybdate red and chrome yellow pigments is improved by precipitating onto the pigment stabilized by silicium dioxide, aluminum oxide and/or antimony trioxide a mono-, di- or triamine having one aliphatic chain of 10 to 20 carbon atoms and adding to the so-obtained dispersion a water-dilutable lacquer binding agent.

10 Claims, No Drawings

PROCESS FOR THE PREPARATION OF EASILY DISPERSIBLE AND STABLE MOLYBDATE RED AND CHROME YELLOW PIGMENTS

The present invention relates to a process for the preparation of easily dispersible and stable molybdate red and chrome yellow pigments.

The present invention relates to a process for the preparation of easily dispersible molybdate red pigments which are stable to trituration and easily dispersible chrome yellow pigments in lacquers which cross-link when heated. As can be seen from numerous publications and patents, the improvement of the dispersibility of pigments has been discussed more and more frequently during the past few years.

It has already been known that a considerable improvement of the dispersibility of air-drying lacquers, intaglio printing inks, printing and offset printing inks, as well as the dyeing of PVC (polyvinyl chloride), can be obtained by treating the pigment particle surfaces with organic substances. In contradistinction thereto it is still very difficult to obtain an improved dispersibility of inorganic and organic pigments also in lacquers showing cross-linking properties under heat.

In these systems with relatively poor wetting properties, inorganic pigments are difficult to disperse, since the pigment particles easily conglomerate due to the strong surface energies. Attempts are therefore to be made to comminute the pigment into small and very small particles during the process of dispersion.

It is an important task, therefore, to improve the dispersibility of molybdate red and chrome yellow pigments in lacquers being capable of cross-linking under heat, the so-called stoving lacquers.

Another problem, particularly in the case of molybdate red pigments, is to be seen in the poor stability to trituration of these pigments. As has been known for a long time, the shade of molybdate red pigments depends, among other things, on the trituration conditions. During a fairly long dispersion process, even the relatively stable yellowish molybdate red pigments which have very fine crystals show a distinct alteration of shade towards yellow, so that this might well manifest a certain sensitivity to trituration.

The present invention provides the improvement of the dispersibility of chrome yellow pigments and of the dispersibility and stability to trituration of molybdate red pigments, which comprises precipitating an aliphatic mono-, di- or triamine of the formula

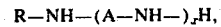

R—NH—(A—NH—)$_x$H, in which R is an aliphatic radical, preferably an alkyl or alkenyl radical, having from 10 to 20, preferably from 16 to 18 carbon atoms, A being an alkylene radical having from 2 to 4, preferably 2 to 3 carbon atoms, and $x$ represents 0, 1 or 2, onto the pigment surface, immediately after precipitating the said pigment and stabilizing it with $SiO_2$, $Al_2O_3$ and/or $Sb_2O_3$, and subsequently adding a water-dilutable lacquer binding agent to the concentrated aqueous pigment suspension.

The water-dilutable lacquer binding agent mainly increases the stability to trituration of molybdate red, whereas the aliphatic amine, and partly also the water-dilutable lacquer binding agent, improves the dispersibility. However, it is only by combining the aliphatic amine with the water-dilutable lacquer binding agent that an excellent dispersion, together with an increased stability to trituration, are obtained in stoving lacquers.

After contacting the water-soluble lacquer binding agent with the pigment suspension, the latter is worked up in known manner, e.g. it is filtered off, washed with water, dried at 80°C, then tempered during 4 hours at 125°C, an is finally ground in a disk attrition mill. The tempering process is not absolutely necessary, however, it results in a further improvement of the dispersibility and the stability to trituration.

As an example for the aliphatic amines there may be mentioned tallow fat alkyl amine, coconut oil alkyl amine and, in particular, N-tallow fat alkyl trimethylene diamine. These amines are dissolved or dispersed in the form of their commercial salts, for example, as oleates in water, while adding acetic acid, and they are subsequently added to the reaction mixture, after the pigment has been precipitated and stabilized, as usual, with $SiO_2$, $Al_2O_3$ and/or $Sb_2O_3$ (cf. German Offenlegungsschrift No. 2 062 775).

The amount of amine added is in the range of from 0.5 to 3.3 %, preferably 2 %, calculated on the pigment weight.

The water-dilutable lacquer binding agents are self-binding agents for non- corrosive lacquers applied by electrostatic dipping and having minimum stoving temperatures. Preparation agents that are particularly suitable are water-soluble epoxide resin esters, water-dispersible air-drying alkyd resins of low oil content, also water-soluble unplastified melamine resins which are well compatible with water-dilutable alkyd resins. It is also possible to use a melamine resin of this kind as a curing component in combination with water-dilutable synthetic resins that do not, or not to a sufficient degree, cure by themselves, especially alkyd resins. The resins are dissolved partly directly in water, and partly but in the presence of a little triethylamine or ammonia.

The lacquer binding agents described are preferably added in the form of an aqueous solution of 5 % strength, during 2 – 3 hours, while stirring, to the concentrated aqueous pigment suspension.

The lacquer binding agents must be water-soluble, they must coat the pigment grains under the given reaction conditions, and they must cure on the pigment surface during the drying process. During drying, a partial splitting off of the groups effecting the water solubility should also take place, which results in a general compatibility with the corresponding stoving lacquers, particularly those which are not water-dilutable.

The amount of water-soluble lacquer binding agents added, which are usually present in the form of a 50 to 70 % by weight solution in lower alkylene glycols and their ethers with lower alkanols, such as butyl glycol, ethyl glycol or glycol ethers, is 2 to 3 %, preferably 2.5 % by weight, of pure solvent free lacquer binding agent, calculated on the pigment.

Suitable lacquer binding agents are known from U.S. Pat. No. 2,479,836.

By means of the coating of the pigment particles with the water- dilutable lacquer binding agents claimed and the curing of these agents on the pigment surface, the molybdate red pigments are protected during the process of dispersion in stoving lacquers by means of a paint shaker in such a way that there is less alteration of the shade towards yellow than there is in the case of the unfinished pigments, even during a fairly long dispersion process.

Thus, the molybdate red pigments prepared according to the invention process have besides the improved dispersibility in alkyd-melamine resin stoving lacquers also a higher stability to trituration.

The following Example serves to illustrate the invention, the parts and percentages being by weight, unless otherwise stated.

EXAMPLE

As starting product use was made of a suspension of 1.08 parts of precipitated fine-crystalline yellowish molybdate red stabilized by 4 % of $SiO_2$ and 4 to 5 % of $Sb_2O_3$ in 23 parts of water.

At a temperature of 60°C, 0.02 part of N-tallow fat-alkyl trimethylene diamine dioleate were added, while stirring, to 0.4 part of water and were dissolved, after 0.006 part of concentrated acetic acid had been added. This partial solution (or emulsion) was introduced during 20 minutes into the pigment suspension, while stirring thoroughly, while the pH was maintained constant between 7.5 and 8.2, by adding diluted sodium hydroxide solution at the same time.

The suspension thus treated was made up with water to double its volume, was allowed to deposit, was decanted and made up, once more, with water. After decanting the supernatent aqueous solution once again, 0.04 part of a commercial water-dilutable unplastified melamine resin (63 % solution in water and glycol ethers) was added continuously, in the form of an aqueous solution that was diluted to 5 % strength, within 2 hours, at a pH of 7, to the concentrated aqueous pigment suspension that was now well stirred.

After stirring was discontinued, the pigment suspension having a finished surface deposited further and was filtered off after the supernatent aqueous solution had been decanted.

The pigment was washed with water, was dried at 80°C, was then tempered during 4 hours at 125°C and was finally ground in a disk attrition mill.

In the same way an easily dispersible chrome yellow pigment can be prepared.

Generally, pigments are relatively hard to distribute in concentrated stoving lacquers, so that only easily dispersible pigments obtained under these trituration conditions can be coated on surfaces, in order to give films having a smooth and glossy surface and being free from specks.

The molybdate red and chrome yellow pigments prepared according to the process of the invention were dispersed for 15 minutes in concentrated alkyd-melamine resin stoving lacquer on a vibration ball mill (type "Red Devil") in plastic beakers with glass beads (having a diameter of 2 mm), and were subsequently applied to white cardboard, by means of a coating device. After drying (during 15 minutes at 140°C), the dispersibility in stoving lacquer of the molybdate red and chrome yellow pigments could be examined readily, by checking the surface properties and any pigment specks.

While the lacquer films pigmented with untreated molybdate red and/or chrome yellow pigments had a very coarse-grained and rough surface which showed many specks as well as a strong reduction of gloss, the samples prepared with N-tallow fat-alkyl trimethylene diamine as well as a water-soluble unplastified melamine resin had a considerably better dispersibility in stoving lacquer. The lacquer films were almost completely free from specks and showed a good gloss.

The molybdate red and chrome yellow pigments prepared according to the process of the invention were tested with regard to their dispersibility by a dissolver, in which process the fineness of grain in particular, as well as the pigment specks still present in the lacquer films, were considered for judgment.

The pigments prepared with tallow fat-alkyl trimethylene diamine and a water-soluble unplastified melamine resin can already be dispersed easily by means of a dissolver. However, a careful dispersion in alkyd melamine resin stoving lacquer by means of the dissolver is not sufficient for the untreated yellowish molybdate red in order to produce an optimum color shade. The pigmented lacquer films show a strong reduction of gloss as well as many specks.

The yellowish molybdate red pigments prepared with N-tallow fat-alkyl trimethylene diamine and a water-soluble unplastified melamine resin have quite different properties. In this case, the dispersion in alkyd melamine resin stoving lacquer by means of the dissolver has been effected already to such a degree that the optimum color shade is obtained, and the films are free from grains and specks, which is required for a good gloss.

The brightening of the lacquer films pigmented with the pigment and $SiO_2$ shows that there is also a considerably greater tinctorial strength than in the case of the untreated pigment samples.

The resistance to $SO_2$ as well as the gloss of the pigmented lacquer films are not affected by the surface preparation of the molybdate red and/or chrome yellow pigments. With regard to the stability to trituration, the molybdate red pigments prepared with N-tallow fat-alkyd trimethylene diamine and a water-soluble unplastified melamine resin have proved to be more stable, as compared against the untreated pigments.

It is claimed:

1. In a process for preparing an easily dispersible and color-stable molybdate red or chrome yellow pigment stabilized with silicon dioxide, aluminum oxide and/or antimony trioxide and a longchain aliphatic amine the improvement comprising: precipitating said pigment from an aqueous solution, stabilizing it with silicon dioxide, aluminum oxide and/or antimony trioxide, precipitating on the so-obtained stabilized pigment an aliphatic mono-, di- or triamine of the formula

in which R is a hydrocarbon group which is saturated or once or twice ethylenically unsaturated and has 10 to 20 carbon atoms, A is alkylene of 2 to 4 carbon atoms and $x$ is 0, 1 or 2, and adding to the so-obtained aqueous pigment suspension an air-drying, water-soluble lacquer binding agent.

2. A process as defined in claim 1, wherein R has 16 to 18 carbon atoms and A has 2 or 3 carbon atoms.

3. A process as defined in claim 1, wherein the amine is tallow fat-alkyl amine, coconut oil-alkyl amine, or tallow fat-alkyl trimethylene diamine.

4. A process as defined in claim 1, wherein 0.5 to 3.3 % by weight, calculated on the pigment, of amine are added.

5. A process as defined in claim 1, wherein 2 % of amine, calculated on the weight of the pigment, are added.

6. A process as defined in claim 1, wherein the lacquer binding agent is a watersoluble epoxide resin, a water-dispersible air-drying alkyd resin of low oil content or a watersoluble melamine resin.

7. A process as defined in claim 1, wherein 2 to 3 % by weight, calculated on the pigment, of lacquer binding agent are added.

8. A process as defined in claim 1, wherein the lacquer binding agent is added as a solution of 50 to 70 % strength in a lower alkylene glycol or lower alkylene glycol lower alkyl ether.

9. A composition of matter consisting essentially of 0.5 to 3.3 % by weight of an aliphatic mono-, di- or triamine containing 10 to 20 carbon atoms, 2 to 3 % by weight of an air-drying, water-soluble lacquer binding agent, the balance to 100 % being a molybdate red or chrome yellow pigment stabilized by silicon dioxide, aluminum oxide and/or antimony trioxide precipitated thereon.

10. A composition as defined in claim 9, wherein the amine is N-tallow fat-alkyl trimethylene diamine, the lacquer binding agent is a water-soluble melamine resin, the pigment is molybdate red stabilized with 4 % by weight of silicon dioxide and 4 to 5 % by weight of antimony trioxide.

* * * * *